(12) United States Patent
Medioni et al.

(10) Patent No.: US 9,235,928 B2
(45) Date of Patent: Jan. 12, 2016

(54) 3D BODY MODELING, FROM A SINGLE OR MULTIPLE 3D CAMERAS, IN THE PRESENCE OF MOTION

(71) Applicant: University of Southern California, Los Angeles, CA (US)

(72) Inventors: Gerard Guy Medioni, Los Angeles, CA (US); Jongmoo Choi, Gardena, CA (US)

(73) Assignee: University of Southern California, Los Angeles, CA (US)

( * ) Notice: Subject to any disclaimer, the term of this patent is extended or adjusted under 35 U.S.C. 154(b) by 187 days.

(21) Appl. No.: 13/749,318

(22) Filed: Jan. 24, 2013

(65) Prior Publication Data

US 2013/0187919 A1    Jul. 25, 2013

Related U.S. Application Data

(60) Provisional application No. 61/590,305, filed on Jan. 24, 2012.

(51) Int. Cl.
| | | |
|---|---|---|
| *G06T 17/00* | (2006.01) | |
| *G06K 9/00* | (2006.01) | |
| *G01S 17/87* | (2006.01) | |
| *G01S 17/89* | (2006.01) | |

(52) U.S. Cl.
CPC ............ *G06T 17/00* (2013.01); *G06K 9/00342* (2013.01); *G01S 17/87* (2013.01); *G01S 17/89* (2013.01); *G06T 2200/08* (2013.01); *G06T 2210/56* (2013.01)

(58) Field of Classification Search
CPC .................................. G06T 17/00; G06K 9/00
See application file for complete search history.

(56) References Cited

U.S. PATENT DOCUMENTS

| | | |
|---|---|---|
| 7,224,357 B2 | 5/2007 | Chen et al. |
| 7,583,275 B2 | 9/2009 | Newmann et al. |
| 7,856,125 B2 | 12/2010 | Medioni et al. |
| 2002/0191818 A1 | 12/2002 | Matsuo et al. |
| 2004/0027347 A1 | 2/2004 | Farsaie |
| 2007/0031064 A1 | 2/2007 | Zhao et al. |
| 2007/0183651 A1 | 8/2007 | Comaniciu et al. |
| 2008/0031512 A1 | 2/2008 | Mundermann et al. |

(Continued)

OTHER PUBLICATIONS

International Search Report and Written Opinion in International Application No. PCT/US2013/030942, mailed May 21, 2013, 9 pages.

(Continued)

*Primary Examiner* — Mark Zimmerman
*Assistant Examiner* — Michelle Chin
(74) *Attorney, Agent, or Firm* — Fish & Richardson P.C.

(57) ABSTRACT

The present disclosure describes systems and techniques relating to generating three dimensional (3D) models from range sensor data. According to an aspect, 3D point clouds are captured using a 3D camera, where each of the 3D point clouds corresponds to a different relative position of the 3D camera with respect to a body. One of the 3D point clouds can be set as a reference point cloud, and transforms can be determined for coordinates of the other captured 3D point clouds to transform these to coordinates of the reference point cloud. The body represented in the reference point cloud can be segmented into body parts corresponding to elements of a 3D part-based volumetric model including cylindrical representations, and a segmented representation of the physical object of interest can be generated in accordance with the 3D part-based volumetric model, while taking localized articulated motion into account.

16 Claims, 11 Drawing Sheets

(56) References Cited

U.S. PATENT DOCUMENTS

| | | | |
|---|---|---|---|
| 2008/0075326 A1 | 3/2008 | Otani | |
| 2008/0246759 A1 | 10/2008 | Summers | |
| 2010/0098328 A1 | 4/2010 | Se et al. | |
| 2010/0111370 A1 | 5/2010 | Black et al. | |
| 2011/0267344 A1 | 11/2011 | Germann et al. | |
| 2011/0304619 A1* | 12/2011 | Fu et al. | 345/420 |
| 2013/0286012 A1 | 10/2013 | Medioni | |

OTHER PUBLICATIONS

International Search Report and Written Opinion in International Application No. PCT/US2013/023006, mailed May 16, 2013, 9 pages.
Chen and Medioni, "Object Modeling by Registration of Multiple Range Images," 1991 IEEE International Conference on Robotics and Automation, vol. 3, pp. 2724-2729.
Cui et al., "KinectAvatar: fully automatic body capture using a single kinect," Computer Vision-ACCV 2012 Workshops. Springer Berlin Heidelberg, 2013, 14 pages.
Li et al., "Robust single-view geometry and motion reconstruction," ACM Transactions on Graphics (TOG) 28.5 (2009): 175 (10 pages).
Liao et al., "Modeling deformable objects from a single depth camera," Computer Vision, 2009 IEEE 12th International Conference on. IEEE, 2009, 8 pages.
Microsoft Kinect Project, "Communicate with Computers Naturally," retrieved from the Internet on May 23, 2013, http://research.microsoft.com/em-us/um/redmond/projects/kinectsdk 1 page.
OpenNI, "What is OpenNI?", retrieved from the Internet on May 23, 2013, pp. http://www.openni.org/ 5 pages.
Paris et al., "Bilateral Filtering: Theory and Applications," *Foundations and Trends in Computer Graphics and Vision*, 2008, 4(1):1-73.
Siddiqui and Medioni, "Human pose estimation from a single view point, real-time range sensor," Computer Vision and Pattern Recognition Workshops, 2010, pp. 1-8.
Tong et al., "Scanning 3D Full Human Bodies using Kinects," Dept. of Mathematics Zhejiang Univ. Apr. 3, 2012, Retrieved from the Internet. Retrieved on [Jul. 5, 2013], <URL: http://www.math.zju.edu.en/ligangliu.cagd/projects/kinects-capturinghumans/paper/paper-vr2012.pdf> 8 pages.
Weise et al., "Accurate and Robust Registration for In-hand Modeling," IEEE Conference on Computer Vision and Pattern Recognition, 2008, 8 pages.
Curless et al., "A Volumetric Method for Building Complex Models from Range Images", Proc. SIGGRAPH, 1996, 10 pages.
Izadi et al., "KinectFusion: Real-time 3D Reconstruction and Interaction Using a Moving Depth Camera," ACM Symposium on User Interface Software and Technology, Oct. 2011, 10 pages.
Newcombe et al., "Live Dense Reconstruction with a Single Moving Camera", CVPR, 2010, 8 pages.
Weiss et al., "Home 3D Body Scans from Noisy Image and Range Data", Int. Conf. on Computer Vision, ICCV, Nov. 2011, 8 pages.
Office Action dated Apr. 7, 2015, U.S. Appl. No. 13/801,099, 33 pages.

* cited by examiner

3D BODY MODELING, FROM A SINGLE OR MULTIPLE 3D CAMERAS, IN THE PRESENCE OF MOTION

CROSS REFERENCE TO RELATED APPLICATIONS

This application claims priority to U.S. Provisional Application Ser. No. 61/590,305, entitled "Accurate 3D Body Modeling, from a Single or Multiple 3D Cameras, in the Presence of Motion", filed Jan. 24, 2012, and which is hereby incorporated by reference.

BACKGROUND

The present disclosure describes systems and techniques relating to generating three dimensional models from range sensor data, for example, performing three dimensional modeling in the presence of motion.

Three dimensional modeling from range sensor information is an active field. Many advances have been made in using software to build complex three dimensional models using range sensor information. For example, U.S. Pat. No. 7,583,275 to Newmann et al. describes generating a three dimensional model of an environment from range sensor information representing a height field for the environment. In addition, much work has gone into face recognition and reconstruction. For example, U.S. Pat. No. 7,856,125 to Medioni et al. describes a three dimensional face reconstruction technique using two dimensional images, such as photographs of a face. Other approaches for three dimensional modeling using images include those described in U.S. Pat. No. 7,224,357 to Chen et al.

SUMMARY

The present disclosure describes systems and techniques relating to generating three dimensional (3D) models from range sensor data. According to an aspect, 3D point clouds are captured using a 3D camera, where each of the 3D point clouds corresponds to a different relative position of the 3D camera with respect to a body. One of the 3D point clouds can be set as a reference point cloud, and transforms can be determined for coordinates of the other captured 3D point clouds to transform these to coordinates of the reference point cloud. The body represented in the reference point cloud can be segmented into body parts corresponding to elements of a 3D part-based volumetric model including cylindrical representations, and a segmented representation of the physical object of interest can be generated in accordance with the 3D part-based volumetric model, while taking localized articulated motion into account.

Generating the segmented representation can include, for each of the captured 3D point clouds other than the one of the 3D point clouds set as the reference point cloud, transforming the captured 3D point cloud using its transform, segmenting the body represented in the transformed 3D point cloud using the body parts corresponding to the elements of the 3D part-based volumetric model, and determining local motion, for each of the body parts corresponding to the elements of the 3D part-based volumetric model, between the transformed 3D point cloud and the reference point cloud. The 3D point clouds can be captured using a single 3D camera or two or more 3D cameras.

A method for 3D body modeling using multiple depth images obtained from multiple real-time depth sensors (e.g., Microsoft Kinect Project using a PRIMESENSE™ camera & OpenNI) can be used to cover the entire body of a subject and generate an accurate 3D body model using multiple cylindrical representations. In addition, a 3D body model method (as described further herein) can handle the presence of motion and enables using multiple depth images taken from a single 3D camera. The multiple depth images can be obtained either by having a person move in front of a fixed sensor, or by moving the sensor around a person. In any case, the present systems and techniques can provide an accurate registration result between point clouds in the presence of articulation of body parts. The method is also applicable to a multiple camera system with a moving subject.

According to other aspects, computer program products, encoded on a computer-readable medium, and computer systems are described that cause data processing apparatus to perform operations of the inventive methods. For example, a data processing apparatus can be operated to perform local alignment of limbs identified in three dimensional (3D) point clouds captured using a 3D camera, each of the 3D point clouds corresponding to a different relative position of the 3D camera with respect to a body having the limbs, to model the body in the data processing apparatus.

In various implementations, one or more of the following features and advantages can be provided. An accurate 3D model of the human body surface can be generated from a single 3D camera (or more than one 3D camera) in the presence of articulated motion. A registered 3D point cloud can be generated in the presence of articulated motion of the 3D body. In some implementations, the subject can move her body (e.g., rotating body), and the motion of the subject can be used to produce an accurate 3D model by integrating multiple observations. Global transformation between different views can be computed, and individual body parts can be segmented and registered to the corresponding reference parts to produce a full 3D point cloud of a human body. Moreover, registered full body point clouds can be used to produce accurate 3D full body mesh models.

The above and other aspects and embodiments are described in greater detail in the drawings, the description and the claims.

DETAILED DESCRIPTION

Figure 1A:
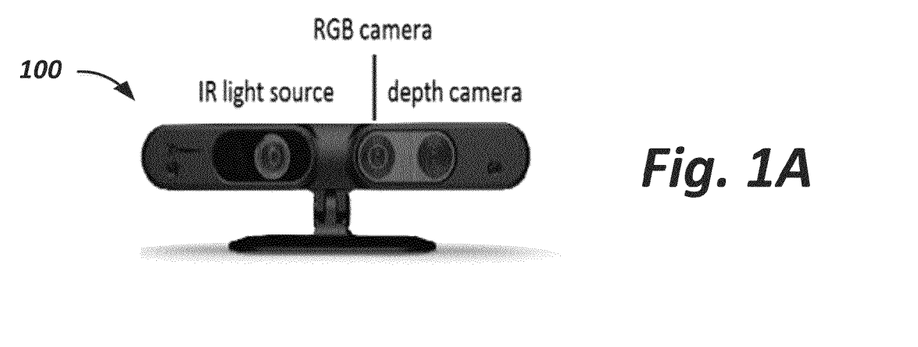
FIG. 1A shows a PRIMESENSE™ camera.

The following description details various sensor configurations for 3D body modeling from one or more cameras (e.g., from a single 3D camera) and non-rigid registration method(s). FIG. 1A shows a PRIMESENSE™ camera 100, which can be used as the acquisition hardware in some implementations. The PRIMESENSE™ camera 100 is available from PrimeSense Ltd. of Tel Aviv, Israel, and includes an infrared (IR) light source, an RGB camera and a depth camera. The PRIMESENSE™ camera 100 is sold as a single unit, and can thus be understood as a single camera or sensor, even though it includes multiple sensor devices. The sensor 100 can provide both a standard RGB image and a depth image containing the 3D information at 30 frames per second in Video Graphics Array (VGA) format. The sensor 100 can also provide RGB information in Super Extended Graphics Array (SXGA) format at 15 frames per second.

The 3D is computed in the infra-red domain thanks to a triangulation method. The sensor 100 can therefore provide results robust to illumination changes and can work in the dark. The hardware is inexpensive, but the low cost comes with a drop in the quality compared to the other state of the art sensors. The resolution is only VGA and the depth data is very noisy, which is a challenge that can be overcome, using the techniques described herein, and in PCT/US2012/042792, which is hereby incorporated by reference. The openNI library (see http://www.openni.org) can be used to facilitate working with the depth information. The depth information can be converted to actual 3D information, and the RGB and depth data can be aligned properly, which enables working with both inputs at the same time.

Figure 1B:
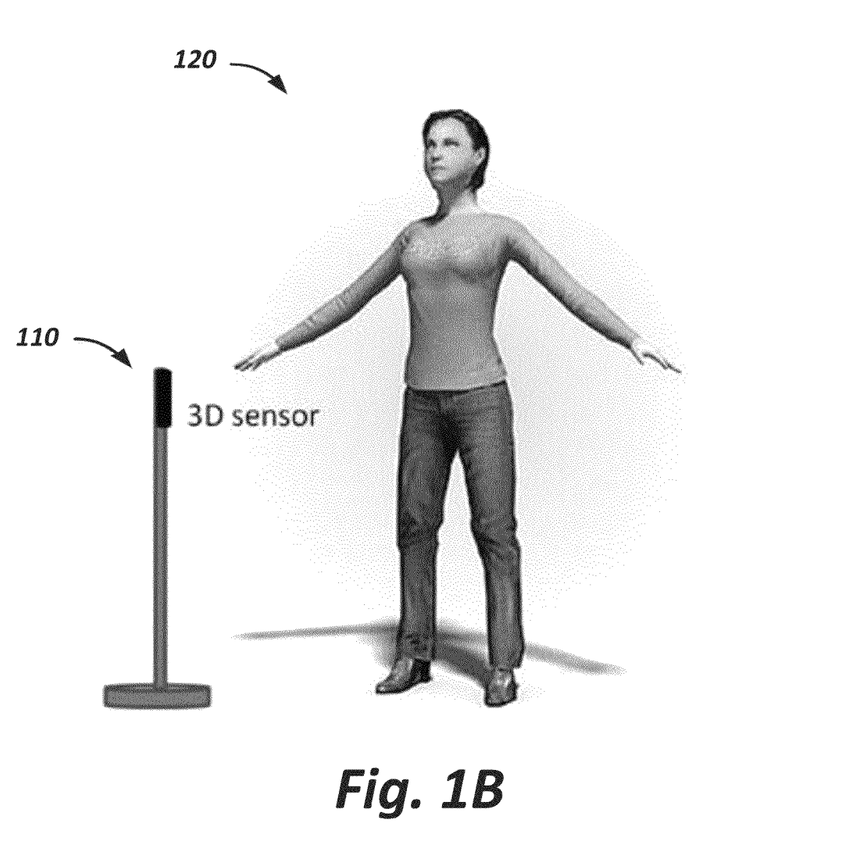
FIG. 1B shows a single sensor arrangement and basic body posture.

FIG. 1B shows a single sensor 110 arrangement and basic body posture 120. As shown, this sensor configuration uses only a single 3D camera 110, which can be the PRIMESENSE™ camera described above. The camera 110 can be mounted vertically (e.g., on a pole, as shown) to maximize the field of view. Also note that the camera 110 can be angled to maximize the coverage of the body. In some implementations, the subject turns his/her body in front of the fixed camera while the 3D camera 110 takes a depth video stream or a set of depth images. For full 3D body modeling, all sides of the body should be exposed to the sensor, and all depth data should be registered to a single reference data (such as described flatter below). FIG. 1B shows the basic posture 120 of a person for the 3D sensing. The depth data from this posture is used as a reference for further registration steps. When the subject turns the body, the method computes an accurate registration result between the point cloud from the current depth frame and the point cloud from the reference frame in the presence of articulation. The system can provide a set of visual and/or audio introductions to guide the body rotation and posture of the subject. For example, the rotation of the body may need to be limited in speed for some implementations.

In an alternative operational scenario, an operator can move a 3D camera 110 around the subject's body while the subject tries to stay with the fixed posture 120. Even in this scenario, the articulation of the body parts should be considered, which is different from standard registration methods or in-hand modeling methods for rigid objects. In any case, each of the captured 3D point clouds correspond to a different relative position of a 3D camera with respect to a body, regardless of whether the different relative positions are set by movement of a body with respect to a camera, movement of a camera with respect to the body, inputs from multiple cameras (which may be fixed in different locations), or a combination of these. Thus, the present methods are also applicable in the case of multiple 3D cameras in the presence of articulated motion.

Figure 2A:
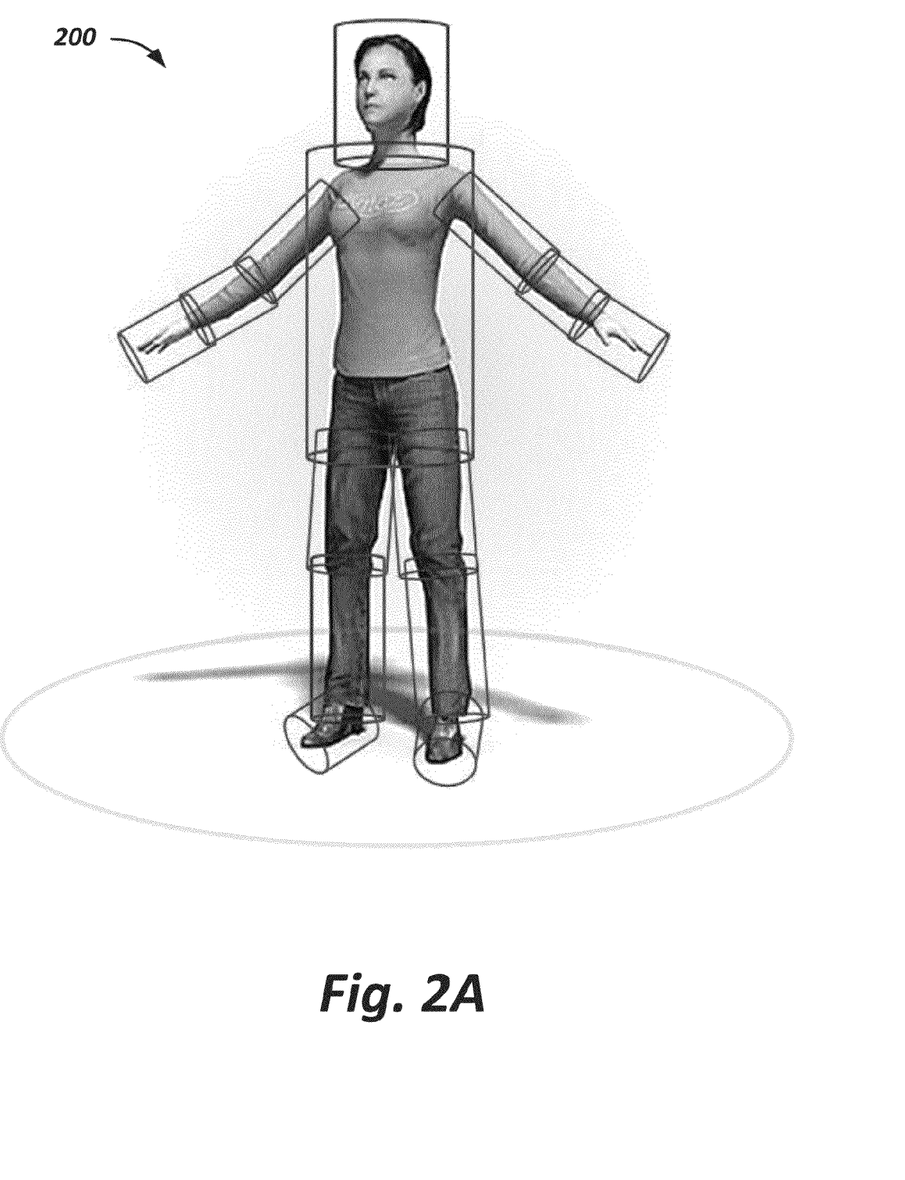
FIG. 2A shows the full body configuration of a human subject modeled as articulation of a set of rigid objects.

FIG. 2A shows the full body configuration of a human subject modeled as articulation of a set of rigid objects 200. In a cooperative sensing scenario, the global motion between different views can be modeled as a rigid motion, as a first approximation. Then, a body part such as a limb, which has some residual (local) error from the global registration, can be registered separately as an individual rigid object. Based on this idea, we first register the global body shape and then refine local body parts to produce a registered full body 3D point cloud. Alternatively, the initial rigid transformation can be obtained by detecting the points belonging to the limbs, and removing them, and finally computing a rigid transformation for the remaining points.

The system can take as input N depth image frames, or sample N frames from the video stream, and convert to 3D point clouds: $\{D(0), D(1), \ldots, D(N)\}$. Each point cloud $D(i)$ is a set of 3D points, $D(i)=\{v(i, 1), v(i, 2), \ldots, v(i, m)\}$, and each 3D point has three measurements, $v(i, j)=[X, Y, Z]$, with respect to the corresponding camera coordinate system. The frontal body posture of the subject can be taken as the first frame and this data can be set as a reference point cloud. The frontal body can be a good reference 3D for the following registration processes. Also, body part segmentation steps can be readily performed when starting with a known posture.

Since wide angle changes (360 degrees) should be supported, computing the rigid motion between two arbitrary 3D point clouds can be a challenge. Hence, we first compute the rigid motion between adjacent point clouds $D(i)$ and $D(i+1)$, which produce limited motion. The motion from $D(i+1)$ to $D(i)$ can be represented as $$D_h'(i,n)=T(i+1,i)D_h(i+1,n),$$

where $D_h$ $(i+1,n)$ is a column vector representing the n-th vertex of the point cloud $D(i+1)$ in the homogeneous coordinate system (e.g., $D_h$ $(i+1, n)$ $[X_n, Y_n, Z_n, 1]^T$), $T(i+1,i)$ represents the (4×4) transformation matrix from $(i+1)$ frame to $(i)$ frame, and $D_h'(i, n)$ is the transformed 3D point with respect to the $D(i)$'s coordinate system. The matrix includes a (3×3) rotation matrix R and a (3×1) translation vector t. Note that this transformation is equivalent to $$D'(i,n)=R\,D(i+1,n)+t,$$

and we use the homogeneous representation ($D_h(i)$ and $D_h(j)$) when we explain the transformation, $T(i, j)$, between two 3D point clouds $D(i)$ and $D(j)$. This homogeneous representation allows us to represent a series of multiple tranformations as a series of matrix multiplication. If we have the relative transformation matrices, $T(i+1, i)$ and $T(i, 0)$, the transformation between the current frame $(i+1)$ to the reference frame $(0)$ can be computed directly as $$T(i+1,0)=T(i,0)T(i+1,i).$$

Using the transformation matrix, each point in the cloud can be transformed to the reference frame according to $$D_h'(0,n)=T(i+1,0)D_h(i+1,n)$$

Iterative Closest Point (ICP) processes can be used on the transformed data $D'(0)$ and $D(0)$ to minimize the accumulated error caused by the relative motion computation steps. This procedure is summarized in Algorithm 1, for computing global registration for the full body, as follows:

Input: N point clouds from a depth sequence: $\{D(0), D(1), \ldots D(N)\}$, $D(i)=\{v(i, 1), v(i, 2), \ldots, v(i, m)\}$//$v(i, j)$: j-th vertex in the i-th point cloud Output:
(1) estimated transformation matrices $\{T(0, 0), T(1, 0), \ldots, T(N, 0)\}$ between $D_h(i)$ and $D_h(0)$
(2) N transformed point clouds with respect to the reference frame $D(0)$: $\{D'(0), D'(1), \ldots D'(N)\}$, $D(0)=D'(0)$ 1. set $D_h(0)$ as the reference, $T(0)=[\text{eye}(3)\ 0^T, 0\ 0\ 0\ 1]$, $0^T=[0, 0, 0]^T$
2. for each pair of points $(D_h(i-1), D_h(i))$
   Use initial motion $(T^\wedge)$ (optional)
   Compute rigid motion $T(i, i-1)$ using ICP
   Validate the quality of estimation
      If not, use different initials for ICP
   Store the motion $T(i, i-1)$ into a memory
3. register all data to the reference
   Take the i-th points $D_h(i)$ and $\{T(i, i-1), T(i-1, i-2), \ldots, T(1, 0)\}$
   Compute the transformation $T(i, 0)$ between $D_h'(i)$ and $D_h(0)$ $$T(i,0)=T(1,0)T(2,1)\ldots T(i,i-1)$$

Transform $D_h(i)$ to $D_h'(0)$ using $T(i, 0)$

After obtaining the global registration result, a local registration procedure can be performed for each body part (e.g., a limb or a leg). This can employ a cylindrical representation, as described further below. For example, the body of a subject can be represented as a set of rigid cylinders corresponding to the upper and lower arms, upper and lower legs, torso, neck and head. For increased details, additional cylinders can be added for the hands and feet as shown in FIG. 2A.

The input to the non-rigid registration step can be N point clouds and corresponding transformation matrices computed by the global registration step. For local registration, individual body parts can be identified from the reference depth map that contains the frontal full body of a subject. Either a skeleton fit algorithm or a simple heuristic methods can be used to segment the body parts. For instance, a projected histogram of a depth map, with respect to the ground plane, allows one to detect the top of the head, the body center, and the center point between two legs.

The reference point cloud $D(0)$ is segmented into k body parts corresponding to the cylindrical representations, such as shown in FIG. 2A. Once the body parts are segmented, each vertex $v(j)$ in the reference data can be classified as one of k body parts. These classified point sets can each be used as a reference body part $R=\{r(1), r(2), \ldots, r(k)\}$. Given a new point cloud $D_h(j)$, $D_h(j)$ is transformed into $D_h'(0)$ using the stored transformation matrix $T(j, 0)$, the nearest point q (in $D'(0)$) is computed from each vertex $r(i)$ (in R) of the reference data, and the label of $q(j)$ is assigned as the same as the label of $r(i)$. If one has a set of segmented parts, a global registration method is applied on the each segmented part. The overall algorithm is described in Algorithm 2, for building full body 3D point cloud using local registration, as follows:

Input: N point clouds from a depth sequence $\{D(0), D(1), \ldots D(N)\}$ and estimated transformation matrices $\{T(0, 0), T(1, 0), \ldots, T(N, 0)\}$
Output: a registered fill body point cloud $B=\{v(1), v(2), \ldots, v(n)\}$
1. Identify body parts from the reference data $D(0)$
2. Segment k body part regions $R=\{r(1), r(2), \ldots, r(k)\}$//a subset of D
3. For each point could $D_h(i)$
   Transform $D_h(i)$ to $D_h'(0)$ using $T(i, 0)$
   Segment k body parts $Q=\{q(1), q(2), \ldots, q(k)\}$ using R
   For each part $q(j)$
      Compute local motion between $q(j)$ and $r(j)$: $M(j)$
      Transform $q(j)$ to $r(j)$ using $M(j)$ As noted above, some implementations can use multiple cameras. In some implementations, an initial phase (which can be performed once offline) can include calibration of the 3D cameras, so that the 3D points they generate individually can be merged into a common coordinate system. One possible way to achieve this calibration is to observe a number of spherical objects in the common field of view of the cameras. At least three readings of the object in three different locations may be necessary, and more can be helpful. Another option is to register the ground plane and two (or more) reference spheres. Each camera measures a partial view of the spherical reference object, from which the center of the sphere can be inferred. Knowing the radius of the sphere makes the solution even more stable. Knowing the 3D position of the center in the different locations allows one to compute the rigid transformation (rotation matrix R and translation vector t) between any two cameras:

$$\text{find } R, t \text{ s.t. } \min\{\Sigma_i \|Q_i-(R P_i+t)\|\},$$

where $P_i$ and $Q_i$ represent i-th 3D points (e.g. $P_i=[X_i,Y_i,Z_i]^T$) taken from camera 1 and the corresponding 3D points from camera 2, respectively. Having more measurements provides a more accurate estimation using an optimization method. Furthermore, all camera positions can also be concurrently estimated:

$$\text{find } R_j, t_j \text{ s.t. } \min\{\Sigma_i \|Q_i-(R_j P_i+t_j)\|\}.$$

where $R_j$ and $t_j$ represent j-th camera's rigid motion. Once these calibration parameters are obtained, a cloud of 3D points can be captured from each camera, and their coordinates can be transformed to the common world coordinate system using the calibration parameters. Alternatively, in single camera implementations, calibration parameters relating different cameras to each other need not be obtained.

Regardless of the number of cameras used, a 3D part-based volumetric model can be built, as noted above. This model can be a 3D part-based cylindrical representation, which can be a set of generalized cylinders with straight axes corresponding to the legs, the forearms, the upper arms, the torso and lower body, and the neck and head. More such cylindrical representations can also be used, for example for the hands and feet.

Figure 2B:
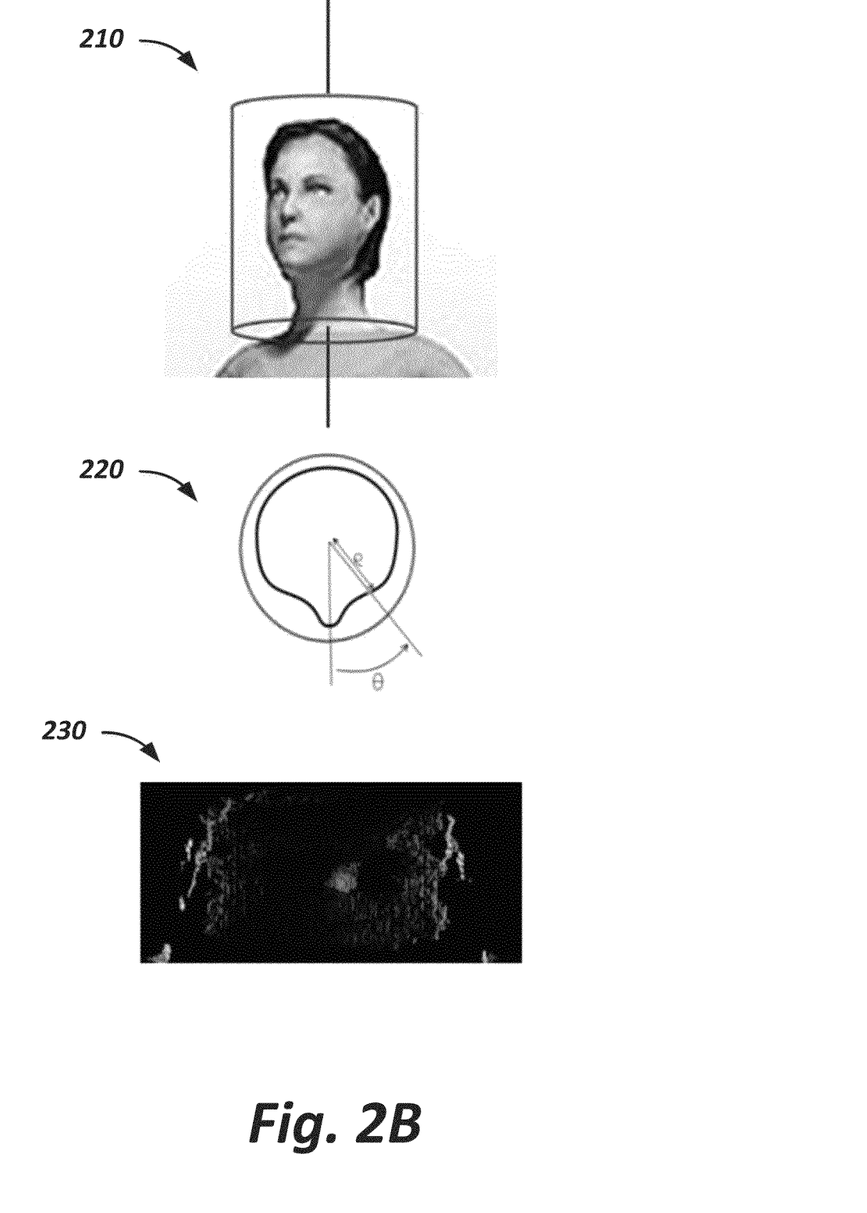
FIG. 2B shows details for a cylindrical representation used to model a body part.

FIG. 2B shows details for a cylindrical representation used to model a body part 210. The internal representation can be that of an image $R(x,\theta)$ 230, where R represent, for example, the radius value of the cylinder 220 at position x along the axis, and $\theta$ the angle. This is called a cylindrical image representation, as shown in FIG. 2B. The advantage of using such a representation is that smoothing can be performed efficiently using image-based operators, instead of mesh-based operators.

Spatial smoothing can be performed to remove the noise inherent in the data capture stage using such low cost 3D cameras. For spatial filtering, a bilateral filter can be used, which can remove the noise while keeping the edges. This filtering process is fast thanks to the cylindrical representation of the model. If multiple temporal instances of a view are acquired, temporal smoothing can be performed, which can further reduce noise. For multiple observations, a running mean can be applied on the value of each pixel of the unwrapped cylindrical map 230. This temporal integration enables reduction of the intrinsic noise while aggregating the data. When the whole data has been aggregated, a linear interpolation method can be applied to fill up any remaining holes in the cylindrical map.

To describe a complex 3D shape, junctions between two or three cylindrical representations should be handled. A solution is to extend the axes connecting multiple parts so as to account for all points. At this stage a representation of the integrated cloud of 3D points is produced in terms of a segmented description of the surfaces. If an overlapping region is in a concave area in the 3D surface, 2D cylindrical maps may contain some holes, but a smooth surface should be obtained even with the presence of noisy 3D points.

Depth map transformation and blending can be employed. The cylindrical representation allows a single continuous mesh to be built in a consistent way for different types of junctions. A critical point can be defined in the center of a junction, in where two or three cylindrical systems join, and separating plane(s) can be defined, which separate these cylindrical representations in the 3D space. Then, the overlapping area can be blended using a depth map transformation and simple filtering. This depth blending method can be used for many types of configurations, provided reasonable local cylindrical systems for different configurations. The following description provides details of the depth map blending method for a bent limb, the body center, and a shoulder region.

Figure 3A:
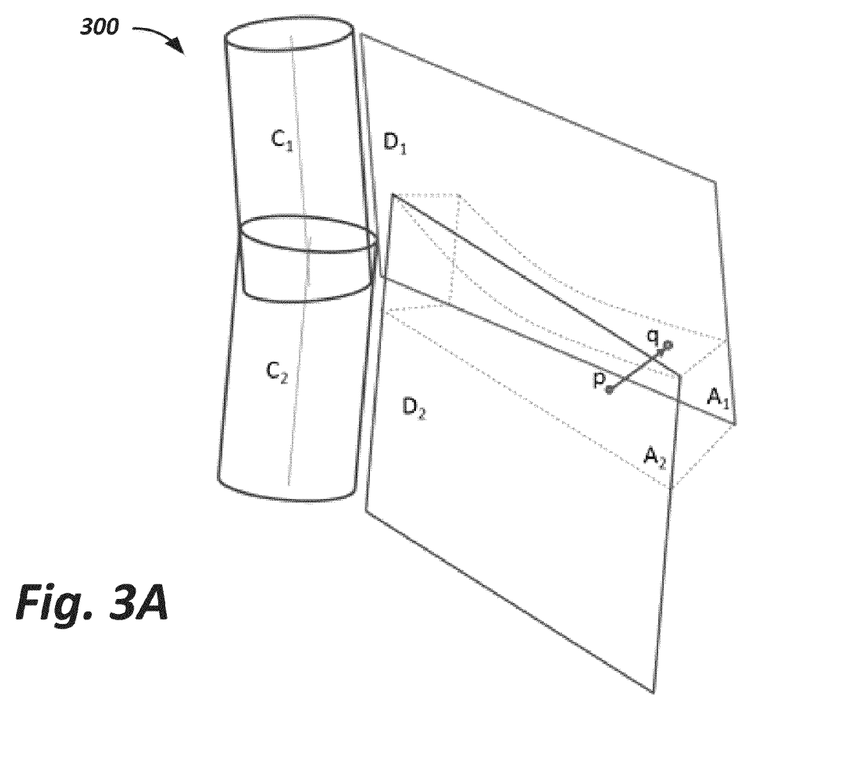
FIG. 3A shows depth blending between two cylindrical maps for a bent limb.

FIG. 3A shows depth blending between two cylindrical maps 300 for a bent limb. The bent limb (or L-shape) is a case in which two cylindrical representations smoothly connect and are represented by two connected cylindrical coordinate systems, C1 and C2. A critical point can be located in the center of the junction and a separating plane between two cylindrical representations. The critical point lies on the separating plane. This point and plane can be inferred, e.g., by using a skeleton fitting procedure. Then, the overlapping region can be defined to have a smooth surface.

Suppose that two unwrapped cylindrical maps, D1 and D2, have overlapping regions A1 and A2, respectively. Even though the regions A1 and A2 represent the identical surface area in the 3D space, the values of depth maps cannot be the same, p≠q, because the values are represented with respect to the two different cylindrical systems, as shown in FIG. 3A.

To blend two depth maps, a map is transformed into the other cylindrical system. One of the cylindrical maps can be set as a reference map and each pixel, p(i), of the target map can be transformed to the reference map. A 3D point can be represented as either a 3D vector in original 3D space, X=[X, Y, Z], or a 2D point in an unwrapped cylindrical map, p=[u, v]. Let h( ) be a function which maps from the 3D space to the 2D map D(j). Given a point p(i) in a depth map D2 from C2, a 3D point X(i) can be reconstructed and projected onto C1 to acquire a transformed point q(i) in depth map D1 space, q(i)=h (inv h (p(i))). With a set of transformed points {g(i)} created, the overlapping region can be blended using a simple filtering method in order to have smooth joining parts. For instance, a simple weighted averaging can be applied for a pair of corresponding points (q(i), q'(i)).

Additional blending techniques can also be used. If the distance between two values is less than a threshold, |p(i)−q(i)|<TH, a weighted average of values can be taken, $$n = w*p(i)+(1-w)*q(i),$$

where w is the weighting parameter (0<=w<=1) representing a normalized distance from the end of the reference map. For instance, if the blending position is located in the center of overlapping area, the mean of two depth values can be taken: [p(i)+q(i)]/2. Otherwise, if the distance between two values is equal or greater than a threshold, the value can be undecided and the location can be set as a hole. After blending all pixels, a simple linear interpolation method can be used to fill out any holes.

Figure 3B:
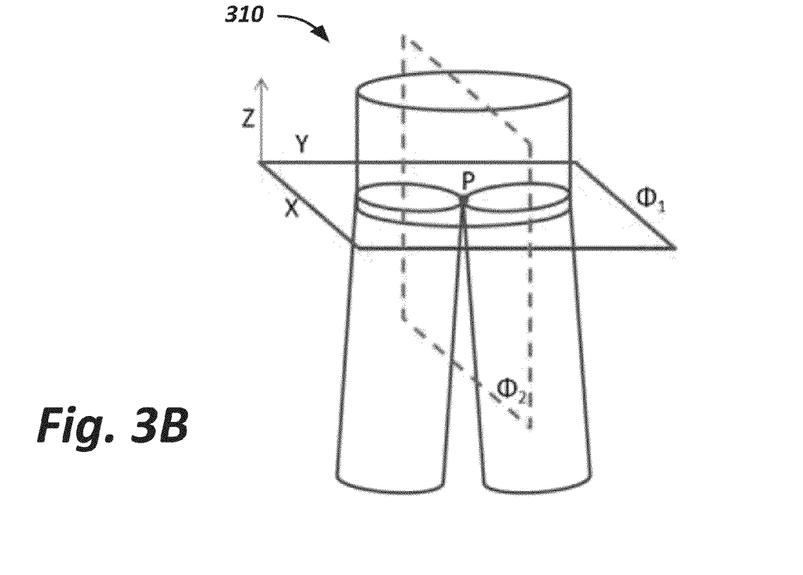
FIG. 3B shows depth blending between cylindrical maps for a body center.

FIG. 3B shows depth blending between two cylindrical maps for a body center 310. This Y-shape shown in FIG. 3B includes a critical point (P) and separating plane (Φ1) for the body center 310. A difficult area to model for the human body is the junction between upper body and two legs. The critical point ('the body center') P, can be defined in the center of the junction, a separating plane can be defined between the upper body and the two legs (Φ1 in FIG. 3B), perpendicular to the torso cylinder axis, and another plane (Φ2 in FIG. 3B) can be defined to separate the two legs, perpendicular to the plane Φ1. The pose of plane Φ1 can be initialized by the ground plane and be adjusted by estimation methods described further below. The critical point P is in the intersection of two planes. The use of skeleton fitting allows estimation of an initial position of the critical point and initial positions of the two planes. Accurate estimation of the critical point and separating planes is described in further detail below.

For depth blending, an overlapping region can be defined around the separating plane Φ1. When two legs are segmented using the plane Φ2, the upper part of each leg may contain some holes while the lower part of the leg can be separated clearly. Since the diameter of each cylinder for a leg is slightly greater than the actual diameter of the sectional circle, the hole filling method can generate a virtual surface which corresponds to the hole pixels.

The cylindrical map generated from the upper body can be set as a reference map and each pixel, p(i), of this map can be compared with a transformed pixel, $$q(i)=h\_j(inv\ h\_i(p(i))),$$

from the target map, generated from the leg. A weighted average of two values {p(i), q(i)} can be used as long as the distance between two values is less than a threshold: |p(i)−q(i)|<TH. Otherwise, if the distance between two values is equal or greater than a threshold, the value of the location can be set as a hole. After blending all pixels, a simple linear interpolation method can be used to fill out any holes.

Figure 3C:
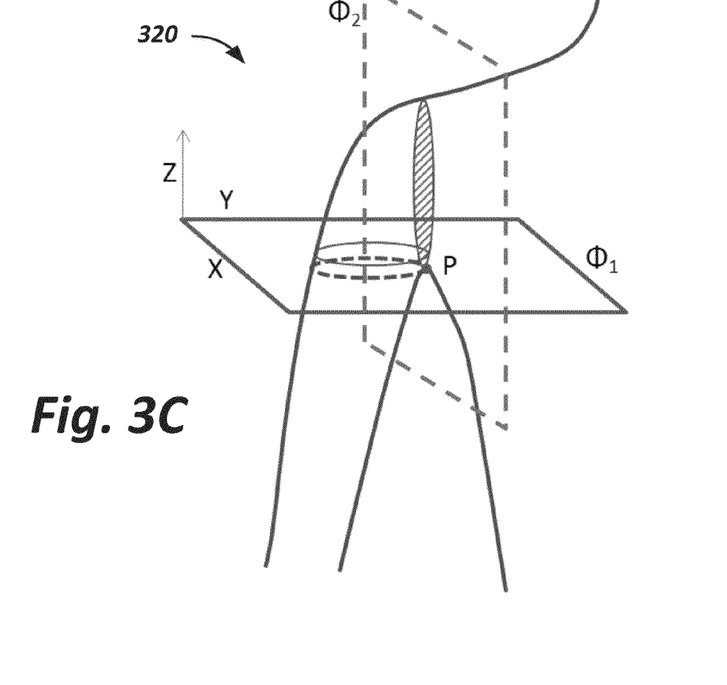
FIG. 3C shows a shoulder junction and blending area.

FIG. 3C shows shoulder junction and blending area. A shoulder area 320 of the body forms a T-shape junction. A critical point P can be defined in the center of the junction, and a separating plane (Φ1) can be defined between the upper body and the arm, perpendicular to the torso cylinder axis, and another plane (Φ2) can be defined to separate the arm and the torso, perpendicular to the plane Φ1. The critical point is in the intersection of two planes. For depth blending, an overlapping region can be defined around the separating plane Φ1. When the arm area is segmented from the torso, the reconstructed arm may contain some holes, which is similar to the case of the body center described above. For depth map blending, the same robust blending method can be applied as described above for the body center.

The cylindrical representations can be used to produce a 3D mesh, which can be useful for visualization and further processing. For a single cylindrical representation, the mesh can be created by creating triangles among the neighboring pixels on a 2D unwrapped cylindrical map. Also, the mesh structure can be simplified by controlling the distance between neighboring pixels. However, to complete meshing for the whole body, connected by many cylindrical representations, a smooth transition between connected parts should be used.

When building a uniform single mesh for the whole body, an inhomogeneous mesh structure can give an obvious seam on the joining part even if a continuous surface is provided. Heuristic techniques can be used to produce a continuous surface for junctions. A reference mesh can be defined, for instance the upper body layer, and for each vertex in the reference mesh, the nearest vertex in the corresponding layer (e.g., leg layer) can be found to form a triangle. Finding the nearest vertex can be computed using Euclidean distance in 3D space. Note that a many-to-one mapping between two sets of points is allowed. Note further that simplification of the mesh to reduce the number of triangles, and to remove overlapping ones, can also be performed using existing tools such as Blender or MeshLab.

In general, the finding of critical points and separating planes can be performed as follows. A critical point and separate planes can be found automatically in a joining area for the depth/mesh blending. The details of such methods are now described for the body center case, the junction between upper body and two legs, but the principles are applicable to other junction types.

Figure 3D:
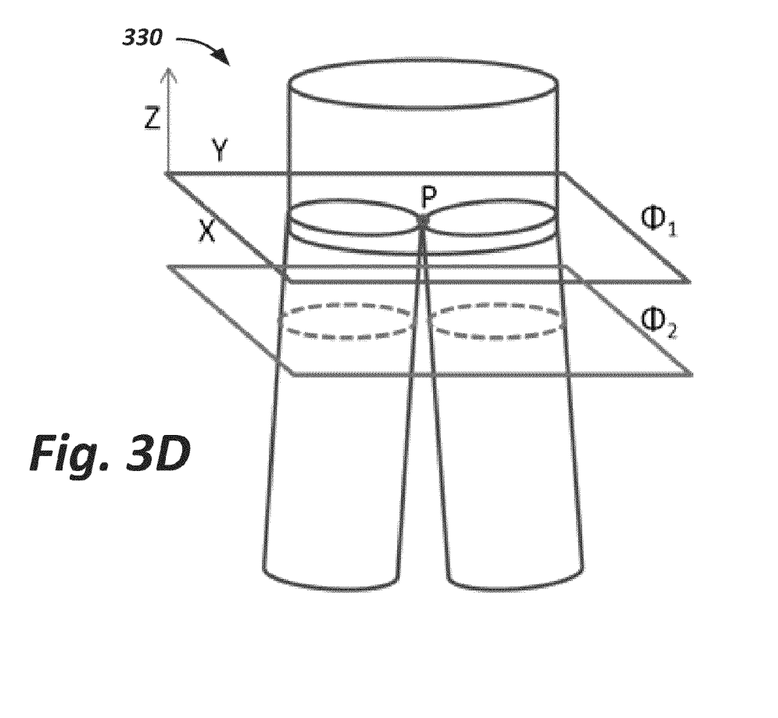
FIG. 3D shows another example of depth blending between cylindrical maps for a body center.

FIG. 3D shows another example of depth blending between cylindrical maps for a body center 330. A critical point ('the body center') P is defined in the center of the junction, as the origin of the local coordinate system so that the XY-plane ($\Phi 1$ in FIG. 3D) is a separating plane between the upper body and the two legs, parallel to the ground plane. The XZ-plane is another plane, perpendicular to the ground plane, separating the two legs. The use of skeleton fitting allows estimation of an initial position of the critical point and initial positions of the two planes. Then, an accurate position of the point can be estimated by several methods described as follows.

In a first method, cylindrical model firing can be used. The body center can be represented using three cylinders as shown in the cylindrical model for the body center in FIG. 3D. The initial pose of cylinders and parameters can be estimated by the skeleton fitting method. The length of the cylinders need not be estimated. Symmetry and identical shape of the two legs can be assumed. Hence, the location of cylinder base (z1), the angle between two legs ($\theta$), the rotation of body (r), the radiuses of cylinders (r1, r2) are the parameters that need to be estimated. Various known techniques, such as RANSAC (RANdom SAmple Consensus) or MCMC (Markov chain Monte Carlo) can be used for this parameter fitting problem.

In a second method, quadratic surface fitting can be used. A specific type of quadric surface, such as a hyperbolic paraboloid (e.g., 6.25 $x^2$−1.562 $y^2$+5.8 z−1=0), can be used to model the shape of the body center. A quadric surface is the zero set of a quadratic expression in three Cartesian coordinates (x,y,z). The generic form is given by $$\frac{x^2}{a^2} + i\frac{y^2}{b^2} + j\frac{z^2}{c^2} + d = 0,$$

where a, b and c are coefficients and i, j and d define the types of quadrics. For the body center as a hyperbolic paraboloid, i, j and d can be set to −1(i=j=d=−1). The angle between two legs, the curve of the body center, and the curvature of the leg surface are represented by parameters a, b and c, respectively. Three coefficients (a, b and c) can be found for the shape, and three translations ($x'=x-t_x, y'=y-t_y, z'=z-t_z$) can be found for the location of body center. The orientation of the shape can be computed using the skeleton fitting method. The RANSAC method can be used for this parameter fitting problem in the presence of noisy depth information.

In a third method, principal component analysis can be used. Principal component analysis (PCA) can be used to find the accurate pose of the separating plane for the body center. An initial location of the critical point $\tilde{P}$ and initial pose of XY plane (z,$\tilde{z}$) can be estimated. The point $\tilde{P}$ can be estimated by the skeleton fitting result, and the orientation of the plane $\tilde{\Phi}_1$ is the same as the ground plane which can be inferred from an initial calibration step. A new plane ($\tilde{\Phi}_2$) can be defined from the initial plane $\tilde{\Phi}_1$, parallel to the XY-plane ($\Phi_1$), at location Y−dY. To find the accurate orientation of the plane $\tilde{\Phi}_2$, the spatial distribution of the 3D point cloud between two planes $\Phi_1$ and $\Phi_2$ can be analyzed. A plane defined by the two largest eigen vectors gives the orientation of the planes $\Phi_1$ and $\Phi_2$.

A search space can be defined between Z−dZ to Z+dZ and a plane (Z value) can be found which gives the maximum kurtosis of the projected point cloud while the estimated critical point has a number of neighbor points. To find the Z value, a cost function can be defined as $$\mathrm{argmin}(z)\left\{Kurt(WX) + \lambda \frac{1}{N(P, Q(j), \theta)}\right\},$$

where Kurt( ) represents kurtosis of the projected point cloud onto the first eigen vector of the plane $\Phi_2$, W is the projection matrix, $\lambda$ is a weighting parameter, N(P, Q (j), $\theta$) is a function to count the number of neighboring points Q(j) within a threshold $\theta$ with respect to the critical point P. After finding the pose of the separating plane $\Phi_1$, the critical point P is located by the median value of 3D points on the plane $\Phi_1$.

Figure 4A:
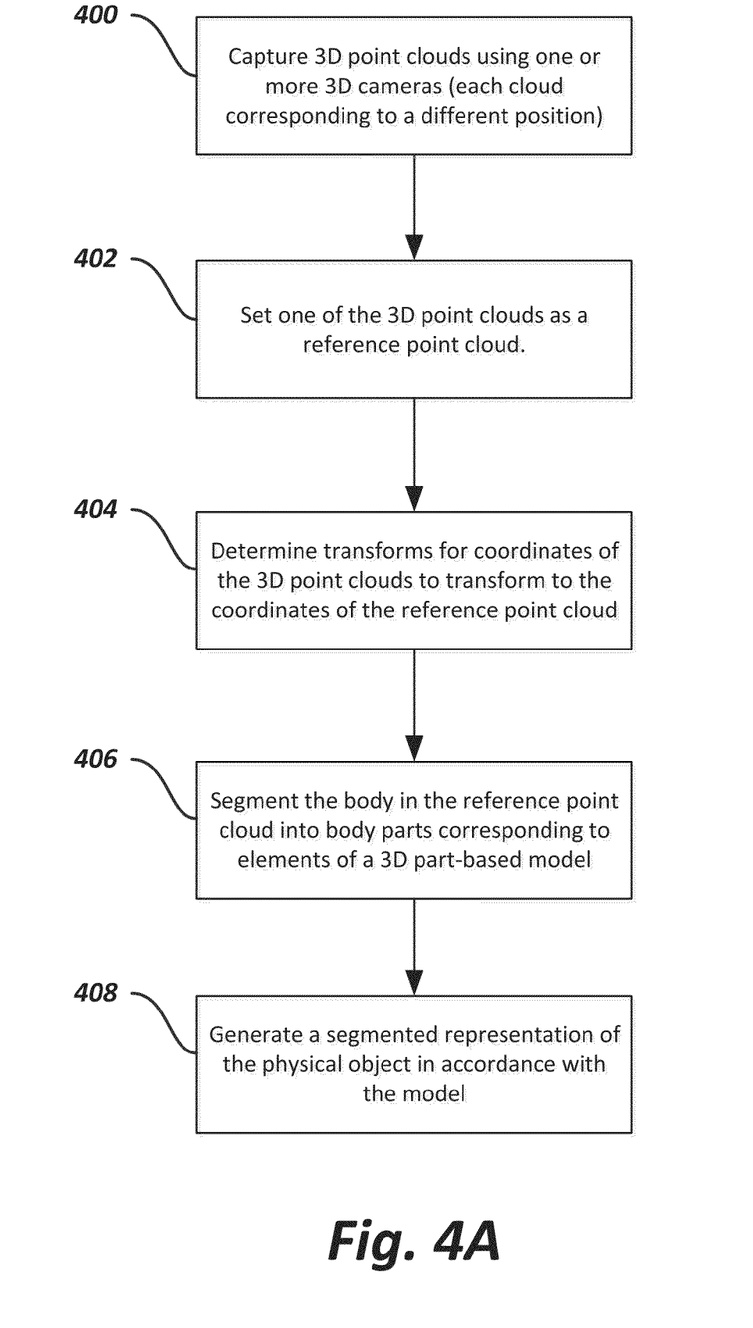
FIG. 4A shows a method of 3D body modelling.

As discussed above, the described set of algorithmic components for accurate body 3D modeling of the human body surface can be used with data obtained from a single 3D camera. FIG. 4A shows a method of 3D body modelling. 3D point clouds can be captured 400 using a 3D camera, where each of the 3D point clouds corresponds to a different relative position of the 3D camera with respect to a body. For example, the 3D point clouds can be obtained using a single PRIMESENSE™ camera in front of which a person has done a complete 360 degree turn.

One of the 3D point clouds can be set 402 as a reference point cloud. For example, the first input in a stream of input from a single PRIMESENSE™ camera can be used as the default reference point cloud. Alternatively, a specified body position, such as the basic body posture 120 from FIG. 1B, can be used for reference. For example, the system can include an input element to note when the person is in the correct position and thus initialize the current input from the camera(s) as the reference point cloud.

Transforms for coordinates of the captured 3D point clouds, other than the one of the 3D point clouds set as the reference, can be determined 404 to transform these captured 3D point clouds to coordinates of the reference point cloud. In some implementations, this can involve performing global registration between point clouds irrespective of any body limbs that may move differently from the body as a whole. In some implementations, such as when the body is segmented before the transforms are determined, this determination of transforms can involve performing global registration between point clouds in which identified limbs have been removed from the data being registered.

The body represented in the reference point cloud is segmented 406 into body parts corresponding to elements of a 3D part-based volumetric model comprising cylindrical representations. This can be done a skeleton fit algorithm or various simple heuristic methods. Moreover, this can involve defining critical points and planes, as described above and now further below.

Figure 4B:
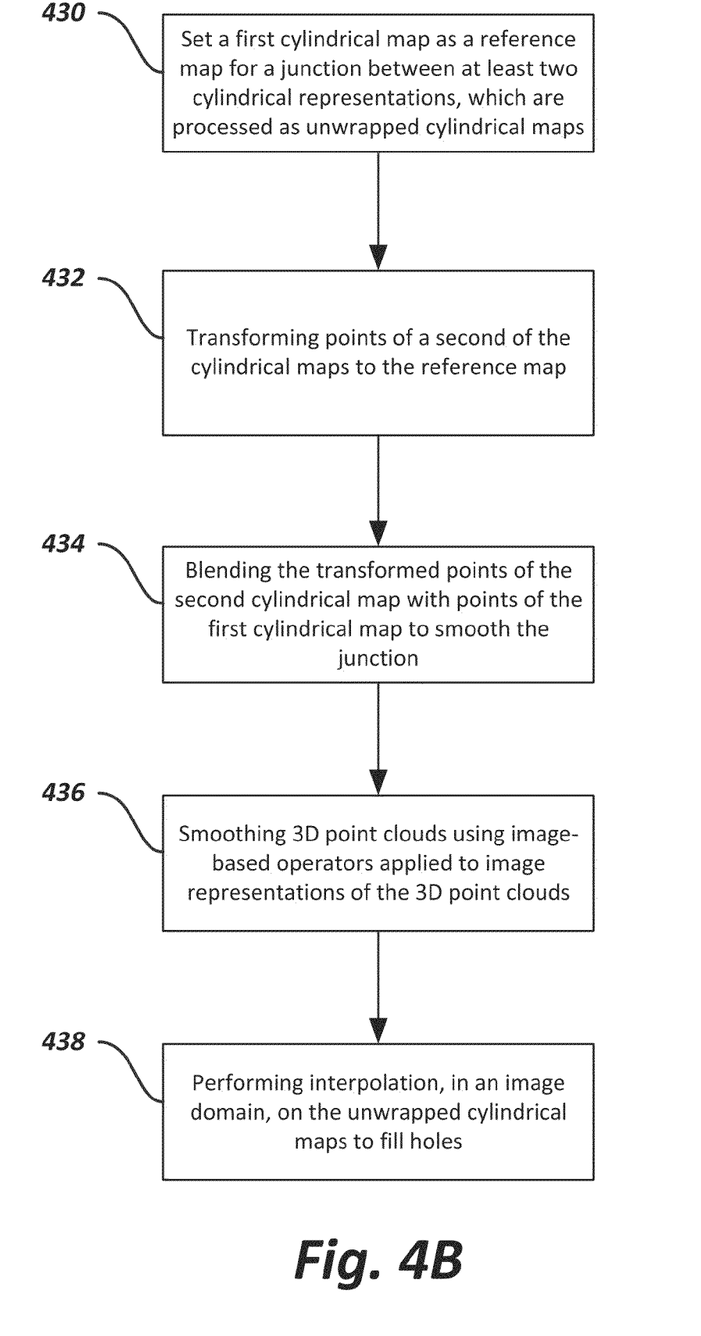
FIG. 4B shows an example of a method of handling junctions in 3D body modelling.

FIG. 4B shows an example of a method of handling junctions in 3D body modelling. In this example, the cylindrical representations of the 3D part-based volumetric model are processed using unwrapped cylindrical maps, as discussed further above. A first of the cylindrical maps is set 430 as a reference map. For example, the cylindrical map corresponding to a cylinder that is closest to the main body/trunk of the person can be set as the reference map. Points of a second of the cylindrical maps is transformed 432 to the reference map, and the transformed points of the second of the cylindrical maps is blended 434 with points of the first of the cylindrical maps to smooth the junction.

As will be appreciated, such blending is not needed in all possible implementations, but may prove useful in many. As discussed above, each of the cylindrical representations can be handled using an image, and image-based operators can thus be readily used, as appropriate. For example, the captured clouds of 3D points can be smoothed 436 using image-based operators. Moreover, interpolation can be performed 438 in an image domain on the unwrapped cylindrical maps to fill holes. Other types of operations and filtering can also be employed.

Referring back to FIG. 4A, a segmented representation of the physical object of interest can be generated 408 in accordance with the 3D part-based volumetric model. This generating can involve detailed operations for each of the captured 3D point clouds to be registered with the reference point cloud. In addition, the output can be the registered point clouds themselves, or this generating can involve further processing before producing an output. For example, the registered full body point clouds can be used to produce accurate 3D full body mesh models, as discussed above. Thus, in some implementations, the output can be a segmented mesh representing the physical object.

Figure 4C:
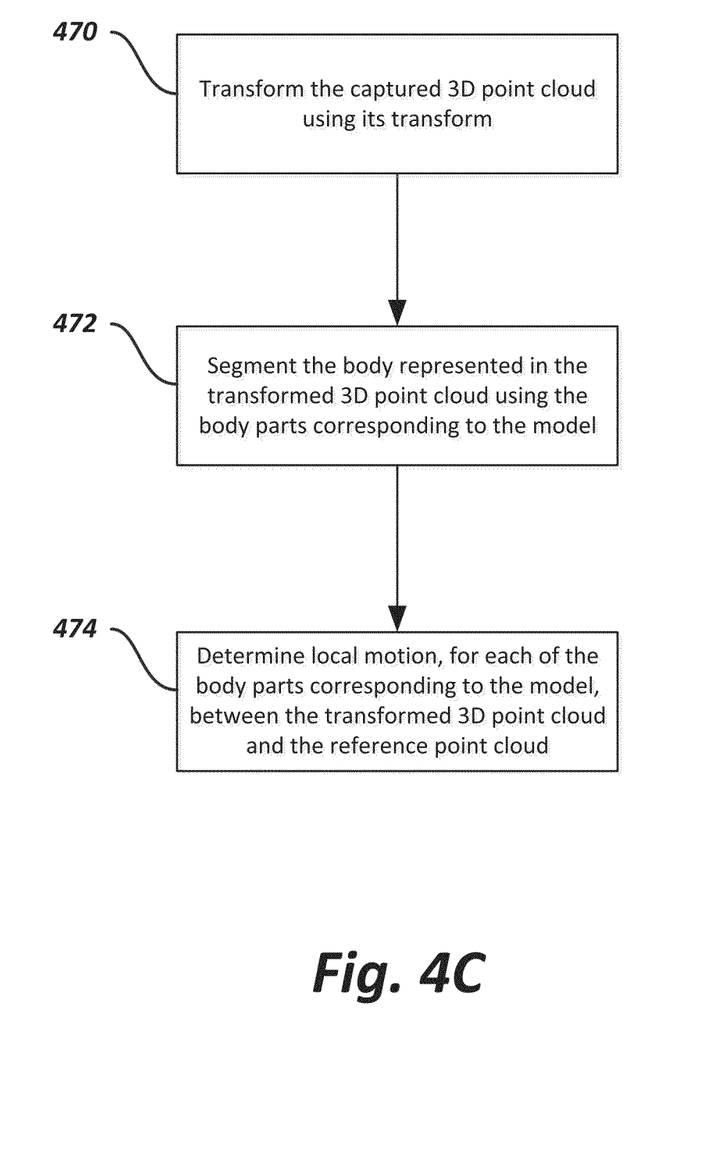
FIG. 4C shows an example of a method of handling articulated motion in 3D body modelling.

FIG. 4C shows an example of a method of handling articulated motion in 3D body modelling. The captured 3D point cloud can be transformed 470 using its previously determined transform. For example, the current 3D point cloud can be transformed to the coordinates of the reference point cloud based on a prior global registration, between the respective point clouds, in which identified limbs have been removed from the data. The body represented in the transformed 3D point cloud can then be segmented 472 using the body parts corresponding to the elements of the 3D part-based volumetric model. Finally, local motion (with respect to the predominant body motion) can be determined 474 for each of the body parts corresponding to the elements of the 3D part-based volumetric model. This local motion indicates the differences between the transformed 3D point cloud and the reference point cloud and thus produces a more accurate final result for registration of the data.

Figure 5A:
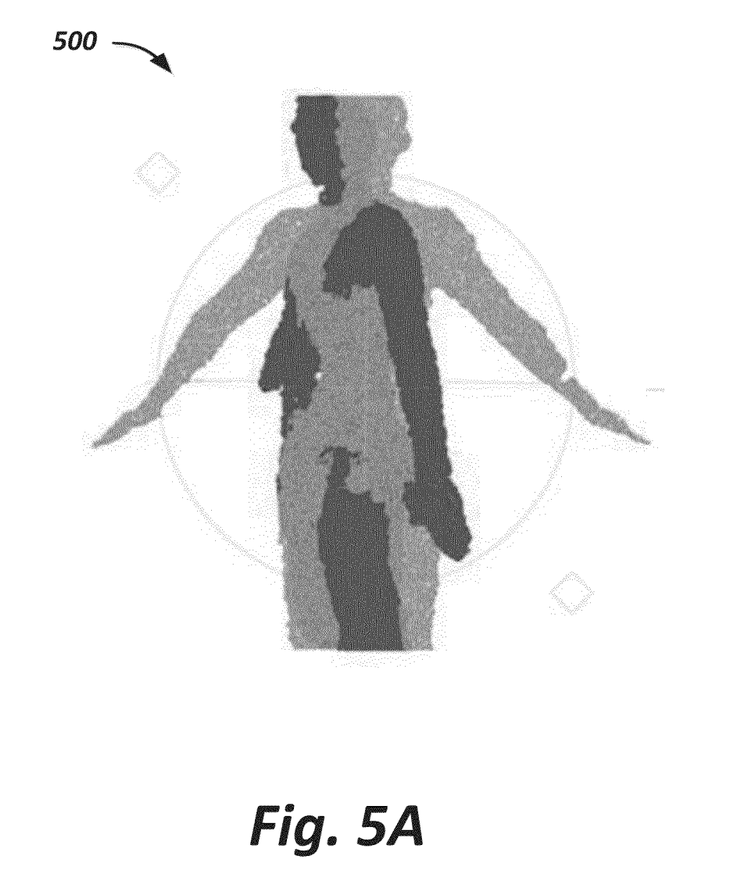
FIGS. 5A-5C show examples of registration results.
Figure 5B:
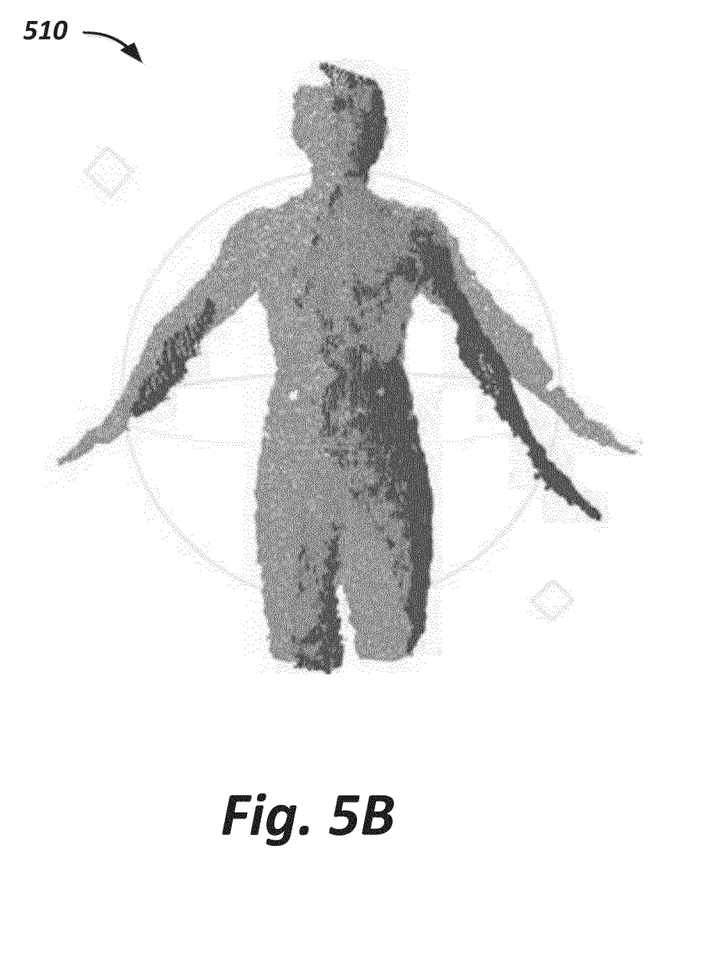
Figure 5C:
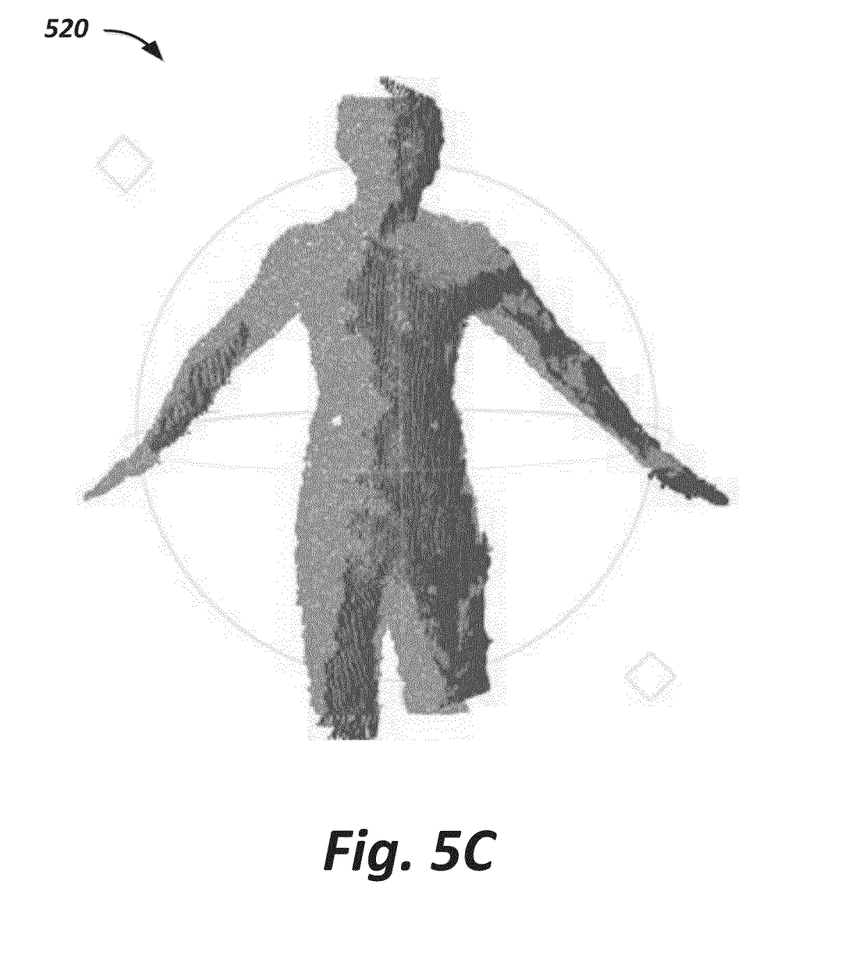

FIGS. 5A-5C show examples of registration results. After taking two depth 3D point clouds from a single 3D sensor while the subject moves some body parts, FIG. 5A shows the result 500 without registration. In addition, because of articulated motion, the rigid registration between two point clouds shows big error on the limbs for the global registration result 510 shown in FIG. 5B. Finally, FIG. 5C shows the result 520 provided by the present systems and techniques in which accurate registration results in the presence of articulated motion.

The processes described above, and all of the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e.g., a computer) to perform the operations described. It will be appreciated that the order of operations presented is shown only for the purpose of clarity in this description. No particular order may be required for these operations to achieve desirable results, and various operations can occur simultaneously or at least concurrently. In certain implementations, multitasking and parallel processing may be preferable.

The various implementations described above have been presented by way of example only, and not limitation. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, the principles, elements and features described may be employed in varied and numerous implementations, and various modifications may be made to the described embodiments without departing from the spirit and scope of the invention. Accordingly, other embodiments may be within the scope of the following claims.

What is claimed is:

1. A method performed by a computer system comprising processor electronics and at least one memory device, the method comprising:
capturing three dimensional (3D) point clouds using a 3D camera, each of the 3D point clouds corresponding to a different relative position of the 3D camera with respect to a body;
setting one of the 3D point clouds as a reference point cloud;
determining transforms for coordinates of the captured 3D point clouds, other than the reference point cloud, to transform to coordinates of the reference point cloud;
segmenting the body represented in the reference point cloud into body parts corresponding to elements of a 3D part-based volumetric model comprising cylindrical representations; and
generating a segmented representation of the physical object of interest in accordance with the 3D part-based volumetric model, wherein the generating comprises, for each of the captured 3D point clouds other than the reference point cloud,
transforming the captured 3D point cloud using its transform,
segmenting the body represented in the transformed 3D point cloud using the body parts corresponding to the elements of the 3D part-based volumetric model, and
determining local motion, for each of the body parts corresponding to the elements of the 3D part-based volumetric model, between the transformed 3D point cloud and the reference point cloud;
wherein a junction between at least two of the cylindrical representations, which are processed as unwrapped cylindrical maps, is handled by setting a first of the cylindrical maps as a reference map, transforming points of a second of the cylindrical maps to the reference map, and blending the transformed points of the second of the cylindrical maps with points of the first of the cylindrical maps to smooth the junction.

2. The method of claim 1, wherein the 3D point clouds are captured using a single 3D camera.

3. The method of claim 1, wherein the segmented representation comprises a segmented mesh representing the physical object.

4. The method of claim 1, wherein each of the cylindrical representations is handled using an image $R(x,\theta)$, where R represents a radius value of the cylindrical representation at position x along the axis, and θ the angle; wherein an axis of at least one of the cylindrical representations is curved; and the method comprises smoothing the captured clouds of 3D points using image-based operators.

5. The method of claim 4, comprising performing interpolation, in an image domain, on the unwrapped cylindrical maps to fill holes.

6. A non-transitory computer-readable medium encoding a program that causes data processing apparatus to perform operations to perform local alignment of limbs identified in three dimensional (3D) point clouds captured using a 3D camera, each of the 3D point clouds corresponding to a different relative position of the 3D camera with respect to a body having the limbs, to model the body in the data processing apparatus; wherein the operations comprise:
   capturing the 3D point clouds using the 3D camera;
   setting one of the 3D point clouds as a reference point cloud;
   determining transforms for coordinates of the captured 3D point clouds, other than the reference point cloud, to transform to coordinates of the reference point cloud;
   segmenting the body represented in the reference point cloud into body parts, including the limbs, corresponding to elements of a 3D part-based volumetric model comprising cylindrical representations; and
   generating a segmented representation of the physical object of interest in accordance with the 3D part-based volumetric model, wherein the generating comprises, for each of the captured 3D point clouds other than the reference point cloud,
      transforming the captured 3D point cloud using its transform,
      segmenting the body represented in the transformed 3D point cloud using the body parts corresponding to the elements of the 3D part-based volumetric model, and
      determining local motion, for each of the body parts corresponding to the elements of the 3D part-based volumetric model, between the transformed 3D point cloud and the reference point cloud; and
   wherein a junction between at least two of the cylindrical representations, which are processed as unwrapped cylindrical maps, is handled by:
   setting a first of the cylindrical maps as a reference map,
   transforming points of a second of the cylindrical maps to the reference map, and
   blending the transformed points of the second of the cylindrical maps with points of the first of the cylindrical maps to smooth the junction.

7. The non-transitory computer-readable medium of claim 6, wherein the 3D point clouds are captured using multiple 3D cameras, and each of the 3D point clouds corresponds to a different relative position of the multiple 3D cameras with respect to the body.

8. The non-transitory computer-readable medium of claim 6, wherein the segmented representation comprises a segmented mesh representing the physical object.

9. The non-transitory computer-readable medium of claim 6, wherein each of the cylindrical representations is handled using an image R(x,θ), where R represents a radius value of the cylindrical representation at position x along the axis, and θ the angle; wherein an axis of at least one of the cylindrical representations is curved; and the operations comprise smoothing the captured clouds of 3D points using image-based operators.

10. The non-transitory computer-readable medium of claim 9, wherein the operations comprise performing interpolation, in an image domain, on the unwrapped cylindrical maps to fill holes.

11. A system comprising:
   processor electronics; and
   computer-readable media configured and arranged to cause the processor electronics to perform operations comprising: capturing three dimensional (3D) point clouds using a 3D camera, each of the 3D point clouds corresponding to a different relative position of the 3D camera with respect to a body; setting one of the 3D point clouds as a reference point cloud; determining transforms for coordinates of the captured 3D point clouds other than the reference point cloud to transform to coordinates of the reference point cloud; segmenting the body represented in the reference point cloud into body parts corresponding to elements of a 3D part-based volumetric model comprising cylindrical representations; and generating a segmented representation of the physical object of interest in accordance with the 3D part-based volumetric model, wherein the generating comprises, for each of the captured 3D point clouds other than the reference point cloud, transforming the captured 3D point cloud using its transform, segmenting the body represented in the transformed 3D point cloud using the body parts corresponding to the elements of the 3D part-based volumetric model, and determining local motion, for each of the body parts corresponding to the elements of the 3D part-based volumetric model, between the transformed 3D point cloud and the reference point cloud; and wherein a junction between at least two of the cylindrical representations, which are processed as unwrapped cylindrical maps, is handled by:
   setting a first of the cylindrical maps as a reference map,
   transforming points of a second of the cylindrical maps to the reference map, and
   blending the transformed points of the second of the cylindrical maps with points of the first of the cylindrical maps to smooth the junction.

12. The system of claim 11, wherein the 3D point clouds are captured using a single 3D camera.

13. The system of claim 11, wherein the segmented representation comprises a segmented mesh representing the physical object.

14. The system of claim 11, wherein each of the cylindrical representations is handled using an image R(x,θ), where R represents a radius value of the cylindrical representation at position x along the axis, and θ the angle; wherein an axis of at least one of the cylindrical representations is curved; and the computer-readable media is configured and arranged to cause the processor electronics to smooth the captured clouds of 3D points using image-based operators.

15. The system of claim 14, wherein the computer-readable media is configured and arranged to cause the processor electronics to perform interpolation, in an image domain, on the unwrapped cylindrical maps to fill holes.

16. The system of claim 11, comprising a server computer system and a user-interface computer, wherein the user-interface computer comprises the processor electronics, and the server computer system comprises the computer-readable media.

* * * * *